United States Patent [19]

Takeda et al.

[11] Patent Number: 4,633,484
[45] Date of Patent: Dec. 30, 1986

[54] RECEIVER UNIT IN RADIO COMMUNICATION SYSTEM

[75] Inventors: Yukio Takeda, Zama; Hiroshi Nakamura, Sagamihara; Eisuke Fukuda, Yokohama, all of Japan

[73] Assignee: Fujitsu Limited, Kawasaki, Japan

[21] Appl. No.: 674,314

[22] Filed: Nov. 23, 1984

[30] Foreign Application Priority Data

Nov. 30, 1983 [JP] Japan .................. 58-224441

[51] Int. Cl.$^4$ .................. H04B 1/68; H04B 15/00
[52] U.S. Cl. .................. 375/77; 375/39; 375/98; 375/102; 455/46; 455/60; 455/202
[58] Field of Search .................. 375/17, 19, 20, 27, 375/39, 43, 57, 58, 77, 106, 118, 97, 99, 102; 371/53, 55, 56, 43, 46; 370/20; 329/50, 105, 124; 455/46, 202, 259, 260, 60, 303, 312

[56] References Cited

U.S. PATENT DOCUMENTS

| | | | |
|---|---|---|---|
| 3,196,352 | 7/1965 | Hopner et al. | 375/43 |
| 3,518,680 | 6/1970 | McAuliffe | 375/39 |
| 3,818,347 | 6/1974 | Holsinger . | |
| 3,849,730 | 11/1974 | Ho | 375/77 |
| 3,959,726 | 5/1976 | Hinoshita et al. | 375/20 |
| 4,114,710 | 9/1978 | Katoh et al. | 375/39 |
| 4,355,397 | 10/1982 | Stuart | 375/39 |
| 4,358,853 | 11/1982 | Qureshi | 375/39 |
| 4,470,145 | 9/1984 | Williams | 375/77 |

FOREIGN PATENT DOCUMENTS

766847 8/1971 Belgium .
0113246 11/1984 European Pat. Off. .

OTHER PUBLICATIONS

Fukuda et al., "Design of 64 QAM Modem for High- -Capacity Digital Radio Systems", IEEE, 1983, pp. 865-869.

Primary Examiner—Benedict V. Safourek
Attorney, Agent, or Firm—Staas & Halsey

[57] ABSTRACT

A receiver unit in a radio communication system in which a transmitter unit outputs transmission data, modulated in accordance with a multilevel QAM method and containing a leakage carrier by addition of a DC offset signal to either one of the quadrature components forming the transmission data, to the receiver unit through a transmission line, including: means for receiving the transmission data; means for branching a signal received at the transmission data receiving means into first and second signal components forming the multilevel QAM data, each including the leakage carrier having a phase difference of $\pi/2$ radian; first channel means for demodulating the first branched signal component and including a first synchronous detection circuit and a first discriminator; second channel means for demodulating the second branched signal component and including a second synchronous detection circuit and a second discriminator; and means for recovering the carrier including a control circuit, for canceling a noise component contained in the output signal from either one of the first and second synchronous detection circuits and for providing only a DC component representing a phase difference between a leakage carrier and a reference carrier, and a phase-locked loop (PLL) circuit, for controlling the phase difference to zero and for providing phase-locked leakage carriers to the reference carriers, having a phase difference of $\pi/2$ radian, to the first and second synchronous detection circuits.

6 Claims, 9 Drawing Figures

RECEIVER UNIT IN RADIO COMMUNICATION SYSTEM

BACKGROUND OF THE INVENTION

1. Field of the Invention

The present invention relates to a radio communication system, more particularly to a receiver unit having a carrier recovery circuit which recovers a leakage carrier included in a received multilevel quadrature amplitude modulation (QAM) signal and synchronously detects the leakage carrier with a reference carrier.

2. Description of the Related Art

In a radio communication system in which data is transmitted on a radio transmission line from a transmitter unit and the transmitted data is received and reproduced at a receiver unit, a carrier is digitally modulated in accordance with data to be transmitted. One of a variety of modulation methods in practical use for such a digital radio communication system is the QAM method.

In a QAM radio communication system, a carrier is modulated in amplitude in accordance with data to be transmitted. The data is thereby transmitted as one of many corresponding coded points arranged on an imaginary plane defined by an in-phase (I) axis and a quadrature (Q) axis. This enables a large amount of data to be transmitted at one time and thus significantly increases the transmission capacity of a radio transmission line.

In a receiver unit, the carrier contained in the received multilevel QAM signal is recovered and divided into two route signals forming I- and Q-channel data signals having a quadrature relationship so as to synchronously detect the quadrature multilevel QAM data signals with carriers having a quadrature relationship. Both synchronous detected data signals are amplitude-discriminated, then the transmitted digital data are demodulated. In order to ensure precise demodulation of the transmitted data signal in the receiver unit, provision of an accurate carrier for synchronous detection of the received multilevel QAM signal is essential.

In a prior art radio communication system, the carrier is suppressed in the transmission data signal. It is, however, difficult to extract the carrier in the receiver unit. A great deal of circuit elements are required for suitably recovering the carrier.

In addition, in the prior art radio communication system, the multilevel QAM signal is generally defined by the number of coded points existing on the quadrature coordinate with an I ordinate and a Q abscissa, such as $4 \times 4 = 16$, $4 \times 8 = 32$, $8 \times 8 = 64$, or more. The most frequently used multilevel QAM method in the prior art is the 16-value method. In this case, a typical 4-phase phase shift keying (PSK) method or Costas loop application method are utilized for recovering the carrier. Also, there is further provided a phase selection control process in the carrier recovery circuit for realizing the process. The prior art carrier recovery circuit, however, cannot suppress phase fluctuation, i.e., "jitter" of the carrier, which adversely affects the synchronous detection.

On the other hand, higher multilevel QAM data, for example, 64 or more, is required to improve the transmission capacity. A prior carrier recovery circuit applied to such a higher multilevel QAM system would suffer from considerably large jitter. At the same time, the receiver unit circuit would become considerably more complex.

In order to overcome the above disadvantages, we previously devised a radio communication system wherein the transmitter unit adds a DC offset to either an I-channel or Q-channel data signal to be transmitted so as to include a leakage carrier. The receiver unit receives the transmission data including the leakage carrier, extracts the leakage carrier, and controls the phase of the leakage carrier to synchronize with the phase of the reference carrier (See "Radio Communication System", U.S. Ser. No. 566,401, filed on Dec. 28, 1983 or EPC Application No. 83307949.4, filed on Dec. 23, 1983 or Korea Application No. 83-6248, filed on Dec. 28, 1983).

While this earlier invention basically solves the problems discussed above, it is preferable to further suppress the jitter of the carrier, with a simple circuit construction, to improve phase control and to facilitate carrier extraction.

SUMMARY OF THE INVENTION

An object of the present invention is to provide a receiver unit having a carrier recovery circuit in a multilevel QAM, preferably a 16-, 32-, 64-, or higher level QAM method radio communication system, which can eliminate jitter of the carrier.

Another object of the present invention is to provide a receiver unit having a carrier recovery circuit in a radio communication system which can easily discriminate received multilevel QAM data signals to ensure obtainment of a fully opened eye pattern.

Still another object of the present invention is to provide a receiver unit having a carrier recovery circuit which can facilitate the extraction of a carrier with a simple circuit construction.

According to the present invention, there is provided a receiver unit in a radio communication system in which a transmitter unit outputs transmission data, modulated in accordance with a multilevel QAM method and containing a leakage carrier by addition of a DC offset signal to either one of the quadrature components forming the transmission data, to the receiver unit through a transmission line, including: means for receiving transmission data; means for branching a signal received at the transmission data receiving means into first and second signal components forming the multilevel QAM data, each including the leakage carrier having a phase difference of $\pi/2$ radian, first channel means for demodulating the first branched signal component and including a first synchronous detection circuit and a first discriminator; second channel means for demodulating the second branched signal component and including a second synchronous detection circuit and a first discriminator; and means for recovering the carrier, including a control circuit, for cancelling a noise component contained in the output signal from either one of the first and second synchronous detection circuits and for providing only a DC component representing a phase difference between a leakage carrier and a reference carrier, and a phase-locked loop (PLL) circuit, for controlling the phase difference to zero and for providing phase-locked leakage carriers to the reference carriers, having a phase difference $\pi/2$ radian, to the first and second synchronous detection circuits.

According to the present invention, there is also provided a similar receiver unit, but where the means for recovering the carrier includes a control circuit, for extracting a signal responsive to a phase difference between inputs and outputs of the first and second discriminators, for summing the extracted signal and an output signal at either one of the first and second synchronous detection circuits, and for providing only a DC component including the phase difference component, and a PLL circuit, for controlling the phase difference to zero and for providing phase-locked leakage carriers to the reference carriers, having a phase difference of $\pi/2$ radian, to the first and second synchronous detection circuits.

According to the present invention, there is further provided a similar receiver unit but where means for recovering the carrier includes a control circuit, for extracting only the leakage carrier component due to the DC offset, and a PLL circuit, for achieving synchronization of the leakage carrier with a reference carrier and for providing phase-locked leakage carriers to the reference carriers, having a phase difference of $\pi/2$ radian, to the first and second synchronous detection circuits.

BRIEF DESCRIPTION OF THE DRAWINGS

Other objects and features of the present invention will be clearly understood with reference to the accompanying drawings, in which.

DESCRIPTION OF THE PREFERRED EMBODIMENTS

Figures 1, 1A:
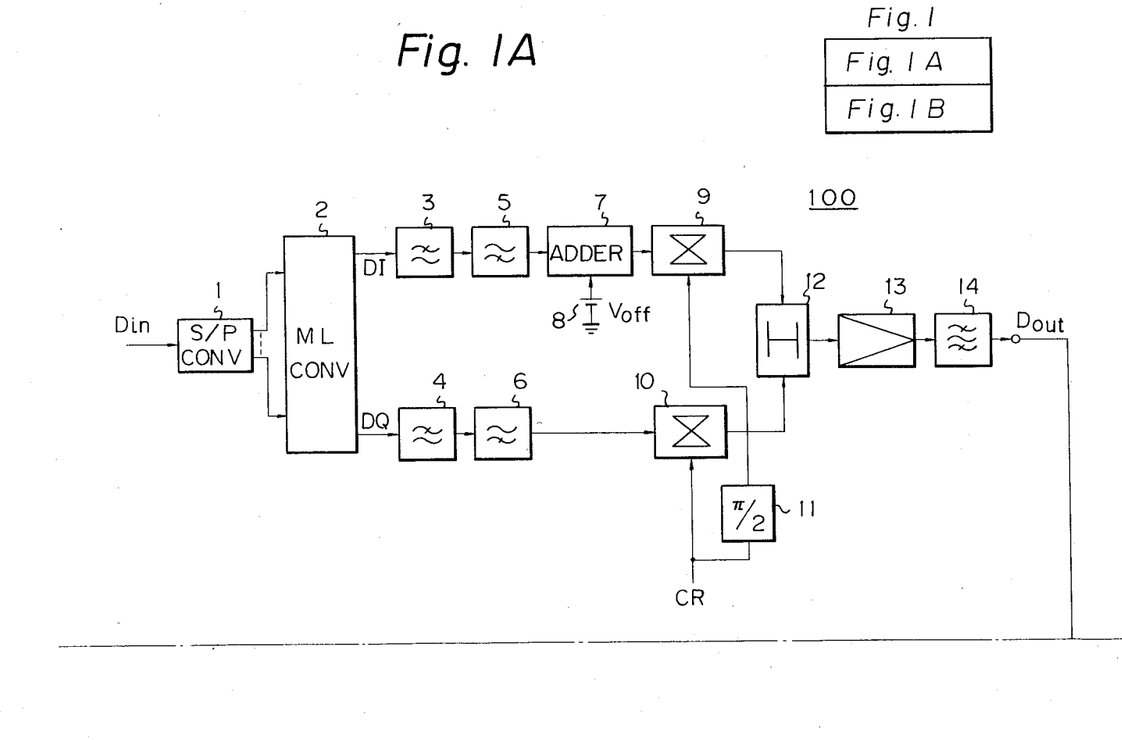
FIGS. 1, 1A and 1B are block diagrams of an embodiment of a radio communication system in accordance with the present invention.
Figure 1B:
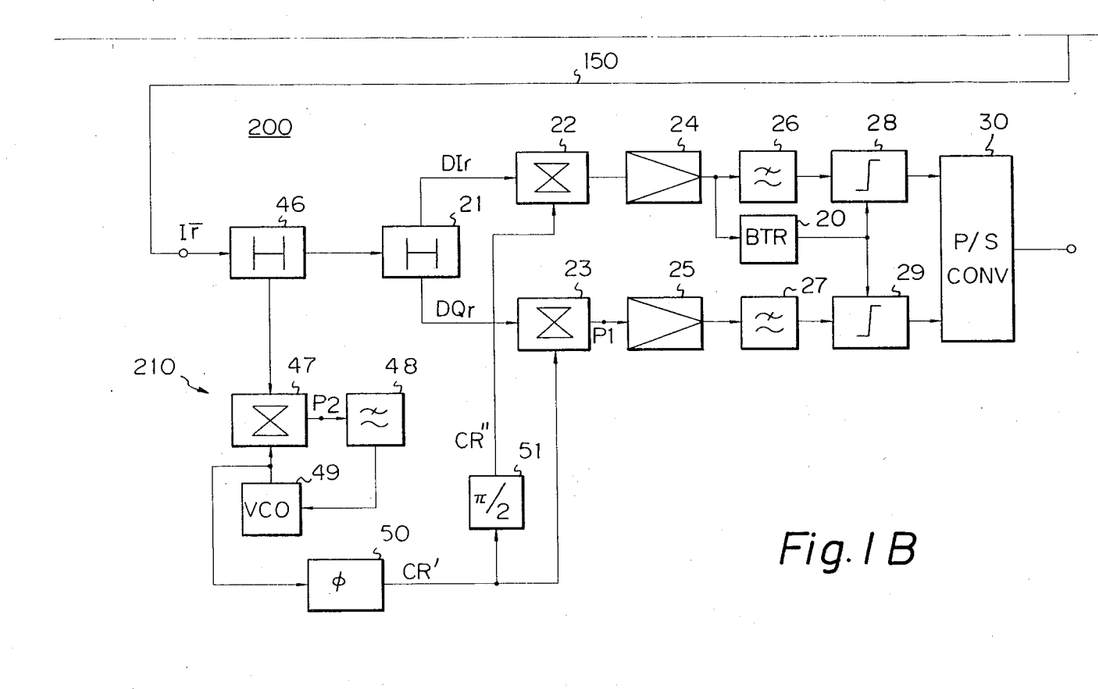

FIG. 1 is a block diagram of an embodiment of a radio communication system in accordance with the present invention. In FIG. 1, the radio communication system includes a transmitter unit 100, a transmission line 150, and a receiver unit 200.

The transmitter unit 100 includes a serial-to-parallel (S/P) converter 1 for converting serial digital input data $D_{in}$, coded by, for example, pulse-code modulation (PCM), to a parallel signal, and a multilevel converter (ML CONV) 2 specifically formed by a digital-to-analog (D/A) converter and for transforming the parallel data from the S/P converter to an analog data signal. Taking as an example a 64-level QAM, the analog data is divided into two route signals each composed of three bit signals expressing eight ($8=2^3$) levels of data. One of the two route signals is the so-called I-channel data signal DI, and the other is the Q-channel data signal DQ.

The transmitter unit 100 includes a low-pass filter 3, a high-pass filter 5, an adder 7, a DC offset source 8, and a modulator 9 in the I-channel, and includes a low-pass filter 4, a high-pass filter 6, and a modulator 10 in the Q-channel. The low-pass filters 3 and 4 are identical and perform band-pass limitation and wave-shaping for the I- and Q-channel signals DI and DQ. The high-pass filters 5 and 6 are identical and reduce amplitudes of the low-pass filtered signals on a carrier frequency $f_0$ to predetermined amplitudes. The reduction of the amplitude will be explained later.

The high-pass filtered I-channel signal is added the offset voltage $V_{off}$ from the DC offset source 8 cooperating therewith at the adder 7. The output from the adder 7 is applied to the modulator 9. Also, the output from the high-pass filter 6 is applied to the modulator 10. A carrier CR having a center frequency $f_0$ is given, on one hand, to the modulator 10 directly and, on the other hand, to the modulator 9 via a $\pi/2$ (90°) phase shifter 11. Thus, a modulation operation is performed to the I-channel data signal biased by the offset voltage $V_{off}$ and the Q-channel data signal with the carrier CR at the modulators 9 and 10.

The transmitter unit 100 further includes a hybrid circuit (H) 12, an intermediate frequency amplifier 13, and a band-pass filter 14. Thus, the quadrature signals of the modulated I-channel and Q-channel signals are added at the hybrid circuit 12. The modulated signal is then amplified at the amplifier 13 and the desired transmission frequency band signal component is chosen by the filter 14. The filtered signal is further amplified up to a predetermined transmission level by means of a high power transmission amplifier (not shown). Accordingly, the multilevel QAM modulated and amplified signal is transmitted from the transmitter unit 100, via the transmission line 150, to the receiver unit 200. In the 64-level QAM method, the multilevel data of the I-channel and the Q-channel consists of a six-bit signal of binary data, consequently, binary six-bit data, which can represent up to 64 values, can be transmitted at one time.

Note that the offset voltage $V_{off}$ is added to the I-channel signal so that a leakage carrier is included in the transmission signal. This will be explained in detail immediately below, with reference to FIGS. 2 and 3.

Figure 2:
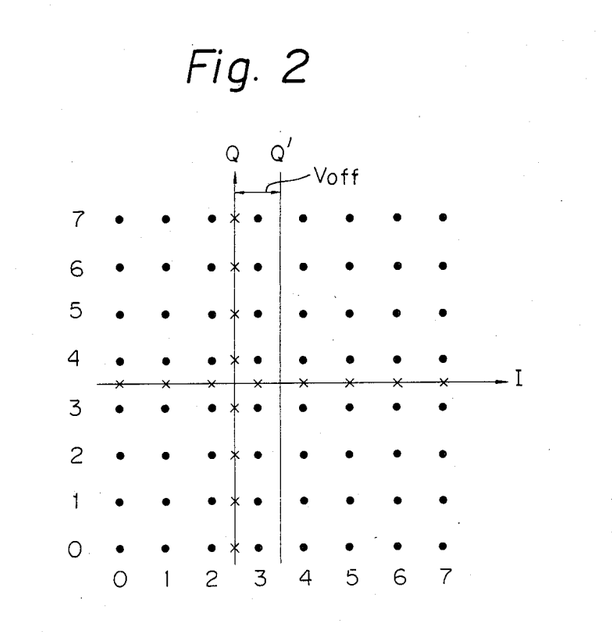
FIG. 2 is a schematic pattern view of the distribution of coded points on an imaginary plane defined by an I-channel, axis and Q-channel axis.

FIG. 2 is a schematic pattern view of the distribution of coded points of I-channel data and Q-channel data, taking the case of a 64-level QAM method as an example. In FIG. 2, the ordinate I represents the I-channel, and the abscissa Q' the Q-channel when the offset value $V_{off}$ is not added to the I channel data at the adder 7. On the other hand, the abscissa Q represents the Q-channel shifted by the offset value $V_{off}$ from the Q axis when the offset value $V_{off}$ is forcibly added to the I-channel data signal, as mentioned above. Each channel has eight coded points. Cross points in the I and Q axes indicate the eight (8)-value amplitude coded points by means of the multilevel I channel data and the multilevel Q-channel data, respectively. Therefore each of the 64 signal components shown as black points in a matrix pattern is defined by vector synthesis with the quadrature amplitude coded signals.

The signal components defined by the coded points of a right-side phase with respect to a central axis Q' and the signal components defined by the coded points of a left-side phase occur with almost the same probability, because the coded points of the 64-level generally occur quite randomly by nature. As a result, there is generally no possibility that the leakage carrier wave component will be in only one particular direction when the coded points occur randomly in the plane defined by both the Q' and I axes.

On the other hand, the signal components of the right-side phase with respect to the shifted axis Q and the signal components of the left-side phase occur at an unbalanced ratio of 5:3, as shown in FIG. 2. As a result, a relative surplus level of 2 (=5−3) is provided so the aforementioned leakage carrier can always stand in the modulated transmission signal.

Figure 3:
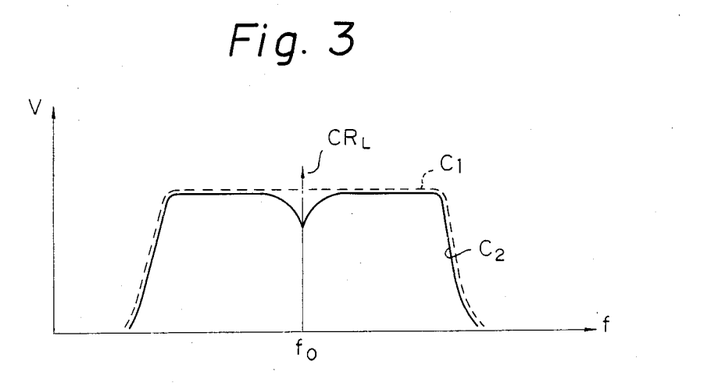
FIG. 3 is a graph of a spectrum of the output from a transmitter unit shown in FIG. 1.

FIG. 3 is a graph of a spectrum of the transmission signal from the transmitter unit 100 shown in FIG. 1. The ordinate f represents frequency, and the abscissa V voltage. The multilevel QAM transmission signal, which does not include the leakage carrier, exhibits a flat characteristic at the middle of the spectrum, as illustrated by a broken curve $C_1$. Therefore, no leakage carrier can be observed. On the other hand, when the DC offset $V_{off}$ is added to the I-channel data signal, the leakage carrier $CR_L$ stands at the middle of the spectrum. In FIG. 3, a V-shaped recess in the vicinity of the carrier frequency $f_0$ on a curve $C_2$ is formed by the high-pass filters 5 and 6 in the transmitter unit 100 to save the power consumption in the radio communication system, because the top level of the carrier $CR_L$ standing on the curve $C_2$ is reduced more than that standing on the curve $C_1$, and to facilitate the extraction of the carrier $CR_L$ in the receiver unit 200 because the carrier $CR_L$ separately stands from the adjacent portions.

Referring to FIG. 1, the receiver unit 200 includes a hybrid circuit 21 for branching the received multilevel QAM signal into two route signals forming I-channel and Q-channel data signals. The receiver unit 200 includes a synchronous detector 22, an amplifier 24, a low-pass filter 26, and a discriminator 28 for the I-channel. The receiver unit 200 also includes a synchronous detector 23, an amplifier 25, a low-pass filter 27, and a discriminator 29 for the Q-channel. The receiver unit 200 includes a bit timing recovery circuit 20 for providing a clock signal used in the discriminators 28 and 29. The discriminators 28 and 29 are analog-to-digital (A/D) converters in this embodiment. The receiver unit 200 includes a parallel-to serial (P/S) data converter 30.

The receiver unit 200 further includes a carrier recovery circuit 210 comprising a hybrid circuit 46, a mixer 47, a low-pass filter 48, voltage-controlled oscillator 49, a variable phase shifter 50, and a π/2 (90°) phase shifter 51. The receiver unit 200 also includes transmission data receiving means consisting of an antenna, a down converter, etc. (not shown).

The operation of the receiver unit 200 will now be explained. The received multilevel QAM signal is branched into an I-channel data signal $DI_r$ and a Q-channel data signal $DQ_r$ at the hybrid circuit 21. The I-channel and Q-channel data signals $DI_r$ and $DQ_r$ are applied to the synchronous detection circuit 22 and 23 and are synchronous-detected with reference carriers CR' and CR'' extracted at the carrier recovery circuit 210 and having a phase difference of π/2 radian. The extraction of the carrier CR' will be explained later.

I-channel and Q-channel synchronous detected output signals from the circuit 22 and 23 are amplified at the amplifiers 24 and 25 and are applied to the discriminators 28 and 29 through the low-pass filters 26 and 27. The bit timing recovery circuit 20 picks up a clock signal contained in the I-channel multilevel QAM signal and generally placed out of the inherent data band and generates a clock signal for driving the discriminators 28 and 29. The discriminators 28 and 29 are A/D converters in this embodiment. Therefore, the I-channel and Q-channel data signals applied to the A/D converters 28 and 29 are converted into three-bit I-channel and Q-channel data signals, respectively. The parallel three-bit I-channel and Q-channel data signals are converted into six-bit serial data, which may be identical to the input data $D_{in}$ in the transmitter unit 100.

For the above operation, a certain level signal may appear on, for example, the Q-channel multilevel data signal output from the synchronous detection circuit 23 at a point P1, in response to both a frequency difference and a phase difference between the leakage carrier, which will be recovered at the carrier recovery circuit 210, and the reference carrier, which may be used at the synchronous detection circuit 23. In order to eliminate the above signal, the carrier recovery circuit 210 is operable to synchronize the phase of the output signal from the voltage-controlled oscillator 33, i.e., the phase of the recovered carrier, to the phase of the reference carrier.

The operation of the carrier recovery circuit 210 will now be explained in detail. When the offset value $V_{off}$ is not added to the I-channel data DI, the modulated transmission signal $f_0(t)$ of the transmission unit 100 is expressed as below:

$$f_0(t) = X(t) \cos \omega t + y(t) \sin \omega t \qquad (1)$$

where,
X(t): I-channel multilevel data,
y(t): Q-channel multilevel data,
ω: Angular frequency.

Accordingly, the transmission signal f(t), when the offset value $V_{off}$ is added, is expressed as below:

$$f(t) = [V_{off} + X(t)] \cos \omega t + y(t) \sin \omega t \qquad (2)$$

The receiver unit 200 receives the transmission signal f(t) expressed by equation (2). The received intermediate frequency signal IF is branched into the Q-channel component at the hybrid circuit 46, and the branched Q-channel component is then applied to the mixer 47. In the mixer 47, the received signal IF undergoes synchronous detection with a carrier of sin (ωt+θ). The resultant signal at a point P2 as well as the point P1 is expressed as below:

$$f(t) \sin (\omega t + \theta) = [V_{off} + X(t)] \cos \omega t \cdot \sin (\omega t + \theta) + \qquad (3)$$

$$y(t) \sin \omega t \cdot \sin (\omega t + \theta)$$

$$= [V_{off} X(t)] \tfrac{1}{2} [\sin (2\omega t + \theta) + \sin\theta] -$$

$$y(t) \tfrac{1}{2} [\cos (2\omega t + \theta) - \cos\theta]$$

where, θ: a phase difference between the reference carrier component and the leakage carrier component.

The signal components of 2ωt in equation (3) are eliminated by the low-pass filter 48. Accordingly, the signal f(t) sin (ωt+θ) is transformed to:

$$\tfrac{1}{2}[V_{off} + X(t)] \sin \theta + \tfrac{1}{2} y(t) \cos\theta \qquad (4)$$

In equation (4), the first expression $\tfrac{1}{2}[V_{off}+X(t)] \sin\theta$ represents the component of the I-channel data signal DI, and the second expression $\tfrac{1}{2} y(t) \cos\theta$ represents the component of the Q-channel data signal DQ. The low-pass filter 48 can also eliminate the signal components of X(t) and y(t). Then, only the output $V_{off}\sin\theta$, which is a leakage component, is obtained from the filter 48. The $V_{off}\cdot\sin\theta$ component can be reduced to zero, in other words, the phase difference $\theta$ can be reduced to zero, when the leakage carrier component $\sin(\omega t+\theta)$ becomes in phase with the reference carrier component sin wt. For this purpose, the output $V_{off}\sin\theta$ from the low-pass filter 48 is supplied to a control terminal of the voltage-controlled oscillator 49. The oscillation frequency of the oscillator 49 is adjusted, in advance, to the optimum frequency when $V_{off}\sin\theta=0$ stands. The output of the oscillator 49 is supplied to both the mixer 47 and the phase shifter 50. The output of the phase shifter 50 is applied to the synchronous detector 23 and to the synchronous detector 22 via the phase shifter 51. The carrier recovery circuit 210 mentioned above operates as a PLL circuit under control of the DC component $V_{off}\sin\theta$ as such to reduce it to zero.

The synchronous detection circuits 22 and 23 are operable to synchronously detect the I-channel and Q-channel data signals $DI_r$ and $DQ_r$ with the reference carriers CR" and CR' being in-phase to the leakage carrier and having a phase difference of $\pi/2$ radian. This ensures high accuracy synchronous detection of the multilevel QAM data and enables high reproductivity of the transmitted higher order multilevel QAM data.

The carrier recovery circuit 210 in FIG. 1, however, is somewhat complex. A simpler circuit was devised, however, the principal philosophy mentioned above stands throughout the present invention.

Figure 4:
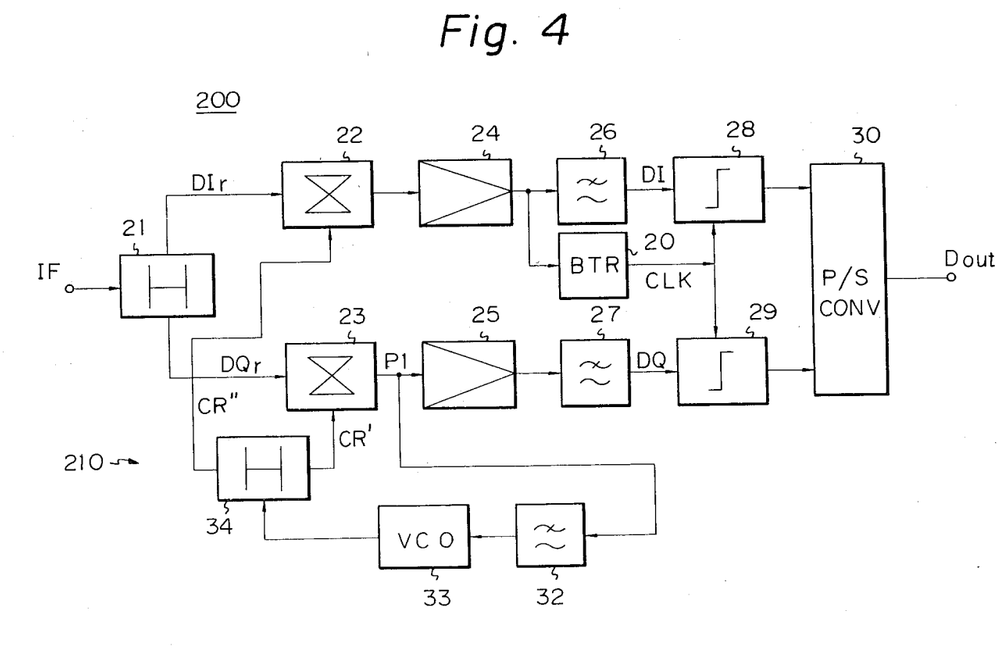
FIG. 4 is a block diagram of another embodiment of a receiver unit in the radio communication system shown in FIG. 1.

FIG. 4 is a block diagram of another embodiment of the receiver unit 200. In FIG. 4, the circuit elements 20 to 30 are identical to those in FIG. 1. The carrier recovery circuit in FIG. 4, bearing reference numeral 210, however, differs from that in FIG. 1. The carrier recovery circuit 210 in FIG. 4 includes a low-pass filter 32, a voltage-controlled oscillator 33, and a $\pi/2(90°)$ hybrid circuit 34. The carrier recovery circuit 210 in FIG. 4 is simpler than that in FIG. 1, because the mixer 47 and the phase shifter 50 of FIG. 1 are omitted. The hybrid circuit 34 operates similar to the phase shifter 51 in FIG. 1, accordingly the hybrid circuit 34 can be replaced by the phase shifter 51. The low-pass filter 32 and the voltage-controlled oscillator 33 are similar to the corresponding elements 48 and 49, respectively.

The operation of the receiver unit 200 in FIG. 4 will now be explained. The circuit elements 20 to 30 operate the same as in the above-mentioned embodiment. As for the carrier recovery circuit 210, the output signal from the synchronous detection circuit 23, at the point P1, can be expressed as in equation (3), mentioned above. The output signal at the point P1 is applied to the low-pass filter 32 which passes only the DC component $V_{off}\sin\theta$ within the leakage carrier component. The DC component is applied to the control terminal of the voltage-controlled oscillator 33, whereby the output phase of the voltage-controlled oscillator 33 is controlled to make the phase difference $\theta$ between the reference and the leakage carriers zero. The carriers CR' and CR", phase-controlled through the hybrid circuit 34, having a $\pi/2$ phase difference, are applied to the synchronous detection circuits 22 and 23. Accordingly, high accuracy synchronous detection is achieved in the synchronous detection circuits 22 and 23, ensuring high quality demodulation of the received multilevel QAM data signal.

Figure 5:
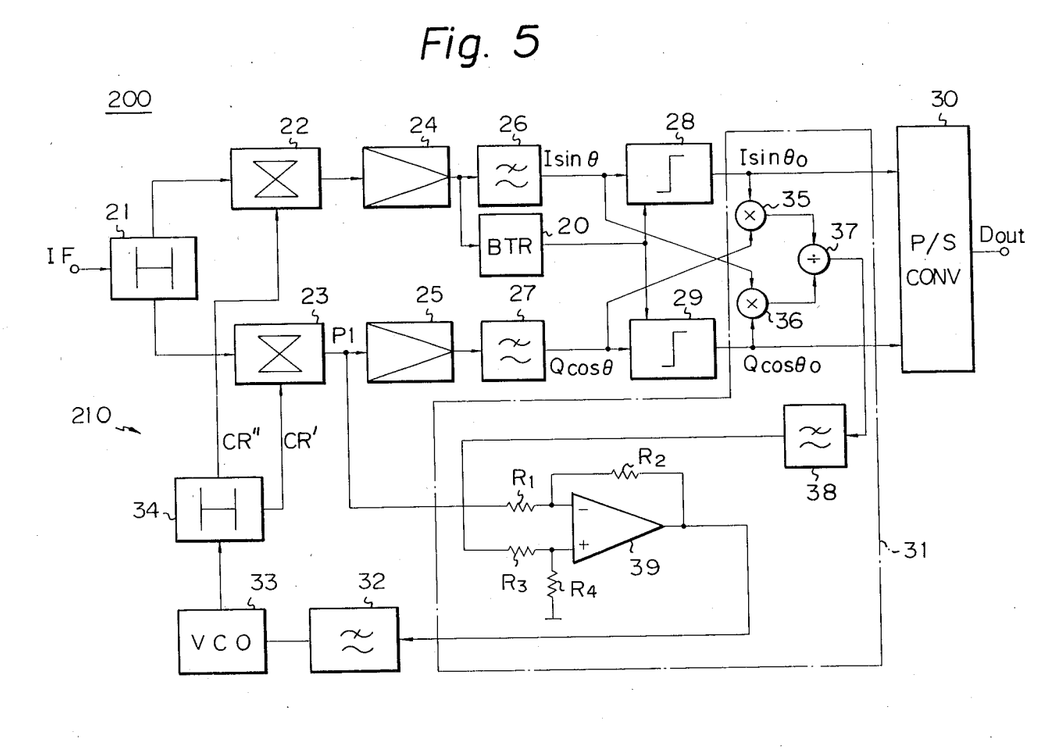
FIG. 5 is a block diagram of still another embodiment of a receiver unit in the radio communication system shown in FIG. 1.

FIG. 5 is a block diagram of still another embodiment of the receiver unit 200. In FIG. 5, the circuit elements 20 to 30 are identical to those in FIG. 1. The carrier recovery circuit 210 includes a phase control circuit 31, a low-pass filter 32, a voltage-controlled oscillator 33, and a $\pi/2$ hybrid circuit 34. The filter 32, the oscillator 33, and the hybrid circuit 34 are identical to the corresponding circuit elements 32, 33 and 34 in FIG. 4. The phase control circuit 31 includes multipliers 35 and 36, a divider 37, a low-pass filter 38, and an amplifier circuit consisting of an operational amplifier 39 and resistors R1 to R4.

The operation of the receiver unit 200 in FIG. 5 will now be explained. Supposing the data signals input at the discriminators 28 and 29 are $I\sin\theta$ and $Q\cos\theta$ and the data signals output at them are $I\sin\theta_0$ 0 and $Q\cos\theta_0$, the output values are $I\sin\theta_0\cdot Q\cos\theta$ at the multiplier 35 and $Q\cos\theta_0\cdot I\sin\theta$ at the multiplier 36. These output values are applied to the divider 37 to obtain the component $\sin(\theta-\theta_0)$ Note that when an eye pattern, well-known and so-called in this field, is fully opened, the phase angle $\theta$ is equal to the phase angle $\theta_0$. On the other hand, when the eye pattern is not fully opened, the phase angle $\theta$ is not equal to the phase angle $\theta_0$.

The signal from the synchronous detection circuit 23, which is expressed by equation (3), is added to an inverted terminal of the amplifier 39. The component $\sin(\theta-\theta_0)$ from the low-pass filter 38 is added to a non-inverted terminal at the amplifier 39. The deviation output from the amplifier 39 is applied to the low-pass filter 32 to extract the DC component $V_{off}\sin(\theta-\theta_0)$ The voltage-controlled oscillator 33 receives the DC component at its control input and controls the phase to synchronize the leakage carrier with the reference carrier and to make the component $\sin(\theta-\theta_0)$ zero. Accordingly, an optimum carrier can be recovered and the eye pattern for the input signal to the discriminators 28 and 29 can be fully opened simultaneously. This results in high quality discrimination at the discriminators 28 and 29 as well as high stability synchronous detection at the synchronous detection circuits 22 and 23 simultaneously.

Figure 6:
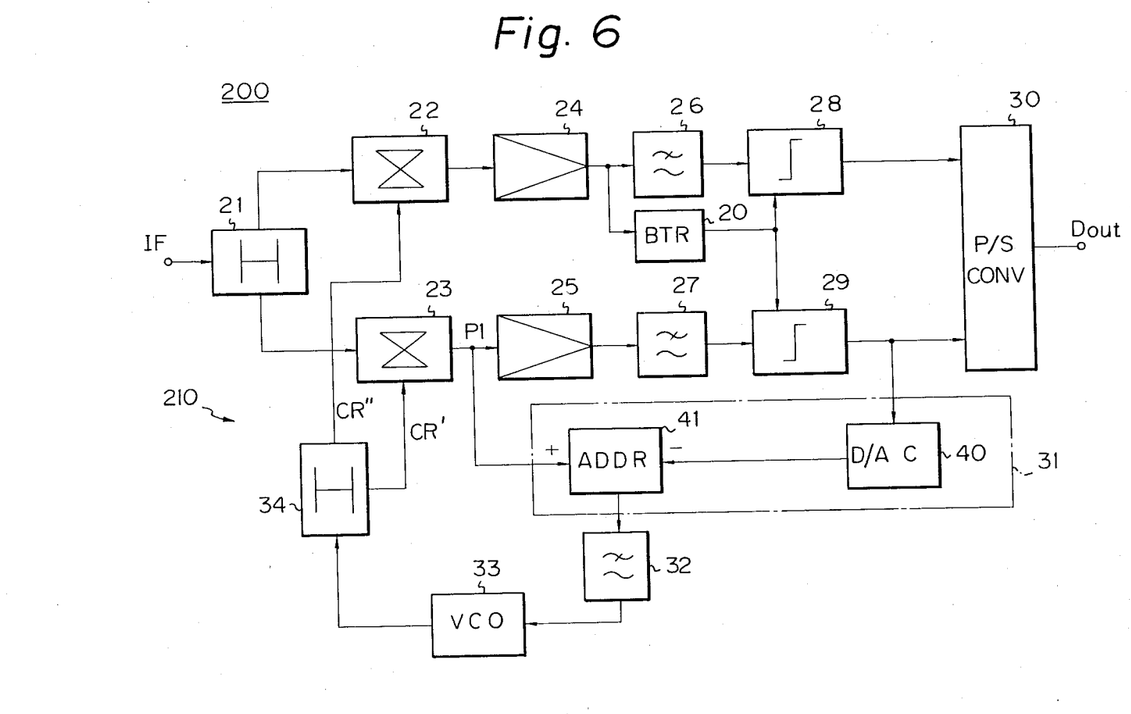
FIG. 6 is a block diagram of another embodiment of a receiver unit in the radio communication system in FIG. 1.

FIG. 6 is a block diagram of another embodiment of the receiver unit 200. In FIG. 6, the circuit elements 20 to 30 are identical to those in FIG. 1. The carrier recovery circuit 210 includes a phase control circuit 31 consisting of a D/A converter 40 and an adder 41; a low-pass filter 32; a voltage-controlled oscillator 33; and a $\pi/2$ hybrid circuit 34. The low-pass filter 32, the voltage-controlled oscillator 33, and the hybrid circuit 34 are similar to the corresponding elements in FIG. 4.

The operation of the receiver unit 200 in FIG. 6 will now be explained. The signal output from the synchronous detection circuit 23 is expressed by equation (3). Accordingly, it includes the leakage carrier component and data component. The higher harmonic components contained in the above output signal can be eliminated by the low-pass filter 32, however, the noise component contained in the baseband signal component may still remain. The remaining noise component adversely affects suppression of the jitter of the carrier at the output of the voltage-controlled oscillator 33. This disadvantage may arise in the circuits in FIGS. 1, 4, and 5. This disadvantage, however, can be solved by providing the phase control circuit 31 in FIG. 6, described below.

The digital Q-channel signal from the discriminator 29 is applied to the D/A converter 40 and converted into an analog signal including the noise component contained in the baseband signal component. At the adder 41, the signal output from the synchronous detection circuit 23 is subtracted by the signal from the D/A converter 40 so that the resultant signal at the output of the adder 41 does not include the noise component contained in the baseband signal component. As a result, the jitter of the carrier can be reduced to zero. This establishes high stability of synchronous detection at the synchronous detection circuits 22 and 23 so that high-quality demodulation of the received multilevel QAM signal is realized. Obviously, the circuit construction in FIG. 6 is quite simple and has no expensive elements.

Figure 7:
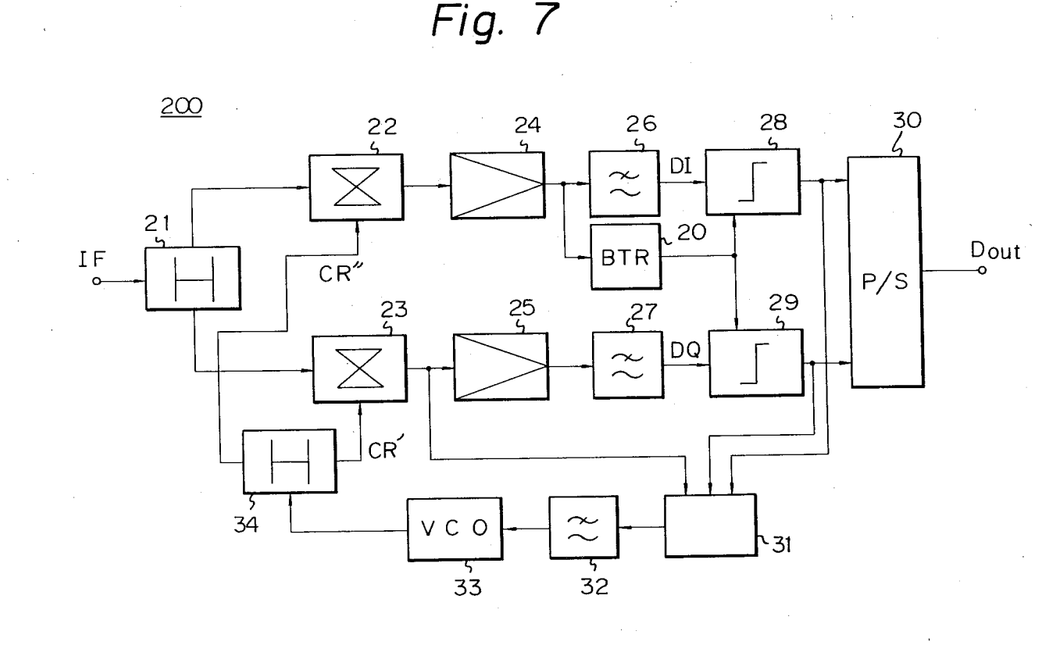
FIG. 7 is a block diagram of still another embodiment of a receiver unit in the radio communication system in FIG. 1.

FIG. 7 is a block diagram of still another embodiment of the receiver unit 200. In FIG. 7, the circuit elements 20 to 30 are identical to those in FIG. 1. Also, the circuit elements 32 to 34 are identical to those in FIG. 4. However, a phase control circuit 31 in FIG. 7 is formed by the combination of the phase control circuits shown in FIGS. 4 to 6. Therefore, the receiver unit 200 in FIG. 7 performs as a combined receiver units in FIGS. 4 to 6.

In FIGS. 5, 6 and 7, the phase control circuit 31 and the low-pass filter 32 forms a control circuit.

We claim:

1. A receiver unit in a radio communication system in which a transmitter unit outputs transmission data, modulated in accordance with a multilevel quadrature amplitude modulation method and containing a leakage carrier by addition of a direct current offset signal to one of quadrature components forming the transmission data. to said receiver unit via a transmission line, said receiver unit comprising:
    means for receiving the transmission data in a received signal;
    means for branching the received signal into first and second signal components containing the transmission data, each signal component including the leakage carrier with a phase difference of $\pi/2$ radian between the leakage carrier in the first and second signal components;
    first channel means for demodulating the first signal component, including:
        a first synchronous detection circuit operatively connected to said branching means; and
        a first discriminator operatively connected to said first synchronous detection circuit;
    second channel means for demodulating the second signal component, including:
        a second synchronous detection circuit, operatively connected to said branching means, for producing a first output signal having a noise component; and
        a second discriminator, operatively connected to said second synchronous detection means, for producing a second output signal; and
    carrier recovery means for generating first and second reference carriers and for cancelling the noise component contained in the first output signal, comprising:
        a control circuit, operatively connected to thq second synchronous detection circuit and the second discriminator, for providing a direct current component representing a phase difference between the leakage carrier and the second reference carrier, including:
            a digital-to-analog converter, operatively connected to receive the second output signal from the second discriminator, for producing a third output signal;
            an adder, having a first input operatively connected to receive the first output signal from the second synchronous detection circuit and a second input operatively connected to receive the third output signal from said digital-to-analog converter, for subtracting the third output signal from the first output signal; and
            a low-pass filter operatively connected to said adder; and
        a phase-locked loop circuit, operatively connected to said low-pass filter and to the first and second synchronous detection circuits in said first and second channel means, respectively, for minimizing the phase difference and for providing the first and second reference carriers, having the phase differencd of $\pi/2$ radian, to the first and second synchronous detection circuits, respectively.

2. A receiver unit according to claim 1, wherein said phase-locked loop circuit includes a voltage-controlled oscillator, having a control terminal operatively connected to receive the direct current component from the control circuit and having an output operatively connected to said first and second channel means, for producing an oscillating signal.

3. A receiver unit according to claim 2, wherein said phase-locked loop circuit further includes a $\pi/2$ radian phase shifter having an input operatively connected to receive the oscillating signal from said voltage-controlled oscillator and having an output operatively connected to the first and second synchronous detection circuits, for applying the oscillating signal, phase-shifted by $\pi/2$ radian, as the second reference carrier to the second synchronous detection circuit.

4. A receiver unit in a radio communication system in which a transmitter unit outputs transmission data, modulated in accordance with a multilevel quadrature amplitude modulation method and containing a leakage carrier by addition of a direct current offset signal to one of quadrature components forming the transmission data, to said receiver unit via a transmission line, said receiver unit comprising:
    means for receiving the transmission data in a received signal;
    means for branching the received signal into first and second signal components containing the transmission data, each signal component including the leakage carrier with a phase difference of $\pi/2$ radian between the leakage carrier in the first and second signal components;
    first channel means for demodulating the first signal component, including:
        a first synchronous detection circuit operatively connected to said branching means, for producing a first output signal; and
        a first discriminator having an input operatively connected to said first synchronous detection circuit, for producing a second output signal at an output;
    second channel means for demodulating the second signal component, including:
        a second synchronous detection circuit, operatively connected to said branching means, for producing a third output signal having a noise component; and a second discriminator, having an input operatively connected to said second synchronous detection means, for producing a fourth output signal at an output; and carrier recovery means for generating first and second reference carriers, comprising:

a control circuit, operatively connected to the inputs and outputs of said first and second discriminators, for extracting an extracted signal indicating a phase difference in dependence upon the inputs and outputs of the first and second discriminators, including:

a first multiplier having a first input operatively connected to the input of the second discriminator, a second input operatively connected to the output of the first discriminator and having an output;

a second multiplier operatively connected to the input of the first discriminator, a second input operatively connected to the output of the second discriminator and having an output;

a divider, operatively connected to the outputs of said first and second multipliers, for providing a quotient therefrom;

an adder having a first input operatively connected to receive the quotient from said divider, a second input operatively connected to receive the third output signal from the second synchronous detection circuit and having an output for supplying a sum of the quotient and the third output signal from the second synchronous detection circuit; and a low-pass filter, operatively connected to the output of said adder, for providing a direct current component including the phase difference component and a phase-locked loop circuit, operatively connected to aaid low-pass filter and to the first and second synchronous detection circuits in said first and second channel means, respectively, for minimizing the phase difference and for providing the first and second reference carriers, having the phase difference of $\pi/2$ radian, to the first and second synchronous detection circuits, respectively.

5. A receiver unit according to claim 4, wherein said phase-locked loop circuit includes a voltage-controlled oscillator, having a control terminal operatively connected to receive the direct current component from the control circuit and having an output operatively connected to said first and second channel means, for producing an oscillating signal.

6. A receiver unit according to claim 5, wherein said phase-locked loop circuit further includes a $\pi/2$ radian phase shifter having an input operatively connected to receive the oscillating signal from said voltage-controlled oscillator and having an output operatively connected to the first and second synchronous detection circuits, for applying the oscillating signal, phase-shifted by $\pi/2$ radian, as the second reference carrier to the second synchronous detection circuit.

* * * * *